United States Patent [19]
Tanaka et al.

[11] Patent Number: 6,046,793
[45] Date of Patent: Apr. 4, 2000

[54] PROXIMITY PRINTING DEVICE WITH VARIABLE IRRADIATION ANGLE

[75] Inventors: Yoneta Tanaka, Yokohama; Hiromi Kai, Akishima, both of Japan

[73] Assignee: Ushiodenki Kabushiki Kaisha, Tokyo, Japan

[21] Appl. No.: 09/025,732

[22] Filed: Feb. 18, 1998

[51] Int. Cl.[7] .............................. G03B 27/54; G03B 27/42
[52] U.S. Cl. ................................... 355/67; 355/53
[58] Field of Search .................... 355/53, 55, 67, 355/71; 250/492.2; 385/146

[56] References Cited

U.S. PATENT DOCUMENTS

| | | | |
|---|---|---|---|
| 5,258,808 | 11/1993 | Watanuki | 355/89 |
| 5,543,890 | 8/1996 | Tanaka et al. | |
| 5,621,498 | 4/1997 | Inoue et al. | 355/67 |
| 5,715,039 | 2/1998 | Fukuda et al. | 355/53 |

FOREIGN PATENT DOCUMENTS 7-74096  3/1995  Japan .

*Primary Examiner*—David M. Gray
*Assistant Examiner*—Peter B. Kim
*Attorney, Agent, or Firm*—Sixbey, Friedman, Leedom & Ferguson; David S. Safran

[57] ABSTRACT

A proximity printing device in which the angle of the light with which a workpiece is irradiated can be changed has an exit part attached on a base and a light source part supported by two bearings. Light emitted from a lamp is focused by an oval focusing mirror and is radiated onto the workpiece via a mask. In one embodiment, two ends of the base are joined to guides of arc-shaped arms. Rotating the base tilts the exit part and the workpiece can be obliquely irradiated with light. Because the light source part is held by two bearings, the lamp of the light source part can be held in a vertical state even when the base is tilted. Furthermore, the direction of motion of the light source part can be limited by means of a ball spline or the like to a horizontal direction, and can be moved by means of a drive so that the exit part can be tilted while holding the light source part vertical.

4 Claims, 8 Drawing Sheets

PROXIMITY PRINTING DEVICE WITH VARIABLE IRRADIATION ANGLE

BACKGROUND OF THE INVENTION

1. Field of the Invention

The invention relates to a proximity printing device in which exposure is performed by irradiation of a workpiece with light which has passed through a mask. The invention relates especially to a proximity printing device in which the angle of the light with which the workpiece is irradiated can be changed.

2. Description of Related Art

The production of electrical and electronic components and parts of various types in which processing of structures in the micron range is necessary utilizes an exposure process. These electronic parts are semiconductor components, liquid crystal display devices, multi-chip modules, etc., in which a host of diverse electronic components is produced on a substrate, and thus, a module and the like is formed.

As one of the exposure systems in the above described exposure device, a proximity printing system is used in which irradiation is performed with parallel light in a state in which there is a small gap between a mask and a workpiece. In the proximity printing system, the advantage is that, as a result of the absence of contact of the mask with the workpiece, the mask is less contaminated, and thus, has a longer service life than in a contact printing system.

FIG. 8 schematically shows the arrangement of a proximity printing device. In the figure, a light irradiation device 10 is shown which comprises a discharge lamp 1, which emits light which contains UV radiation (such as a super high pressure mercury lamp) or the like, an oval focusing mirror 2, a first mirror 3, an integrator lens 4, a shutter 5, a second mirror 6 and a collimator 7.

The light which is emitted from discharge lamp 1, which contains UV light, is focused by means of the oval focusing mirror 2, reflected by first mirror 3, and is incident in integrator lens 4. The light emerging from the integrator lens 4 is reflected, furthermore, via shutter 5 by second mirror 6 and emerges from light irradiation device 10 via collimator 7.

Furthermore, a mask carrier 11 is provided on which a mask M is seated and attached, as is a workpiece carrier 12 on which a workpiece W is seated and attached, a gap adjustment device 12a and a X-Y-Z-θ carrier 13.

An alignment microscope AM is provided by which mask alignment marks MAM of mask M and workpiece alignment marks WAM of the workpiece W are observed and alignment of mask M and workpiece W is performed. Accordingly, irradiation with light which contains UV light from the light irradiation device is produced via the mask.

X-Y-Z-θ carrier 13 is driven by means of a carrier drive device (not shown) and which moves the workpiece carrier 12 in the X-Y-Z-θ directions (X: to the right and left in FIG. 8, Y: forward and backward in FIG. 8; Z: up and down in FIG. 8, θ: in the direction of rotation around an axis perpendicular to the workpiece carrier surface).

Gap adjustment device 12a is positioned to set mask M and workpiece W parallel to one another with a given gap. This can be done using the gap adjustment device disclosed commonly owned, published Japanese patent application HEI 7-74096, or the like.

In the following, exposure of the workpiece W is described with reference to FIG. 8.

First, the mask M is set and attached at a fixed location of mask carrier 11. Next, the workpiece carrier 12 on which workpiece W is placed is moved down by the drive of the X-Y-Z-θ carrier 13. Then, the workpiece carrier 12 is moved up by the drive of X-Y-Z-θ carrier 13 so that workpiece W comes into contact with mask M. Afterwards, the workpiece W is moved further upward. In this way, the gap adjustment device 12a is displaced and the total area of mask M comes into contact with workpiece W, by which the inclination of the mask M agrees with the inclination of the workpiece W.

Next, while maintaining the displaced state of the gap adjustment device 12a, the X-Y-Z-θ carrier 13 is driven and workpiece carrier 12 is moved downward a fixed distance. In this way, the mask M and the workpiece W are set parallel to one another and with a constant gap relative to one another.

After adjustment of the gap between the workpiece W and mask M to a constant value, alignment microscope AM is used to observe mask alignment marks MAM recorded on mask M and the workpiece alignment marks WAM recorded on workpiece W. Driving of X-Y-Z-θ carrier 13 moves workpiece carrier 12 in the X-Y-Z-θ directions so that the positions of mask alignment marks MAM are brought into agreement with the positions of workpiece alignment marks WAM. The light which contains UV light is emitted onto mask M from light irradiation part 10, and thus, workpiece W is exposed.

However, recently there has been a need for exposure by irradiation of a workpiece $W_A$ with a wiring pattern in a stepped area using light which contains UV radiation, as shown in FIG. 9A. Similarly, a need has arisen for exposure by irradiation of workpieces $W_B$ having a three-dimensional arrangement using light which contains UV radiation, as is shown in FIG. 9B.

In the case of exposure by irradiation of the above described workpieces with light which contains UV radiation, the stepped areas cannot be exposed to a sufficient degree, even if the mask is irradiated vertically with light.

This means that, in the case of exposure of workpieces with stepped areas, the stepped areas or the perpendicular surfaces cannot be exposed to a sufficient degree if the light is not obliquely emitted, as is shown in FIGS. 10(a) and 10(b).

In the above described conventional proximity printing device, light irradiation device 10 is located in a fixed position above mask carrier 11 and X-Y-Z-θ carrier 13. Oblique irradiation of the surface of mask M and the surface of workpiece W with light which contains UV radiation is therefore impossible. Therefore, the above described need cannot be met.

SUMMARY OF THE INVENTION

The invention was devised to eliminate the above described defect. Therefore, a first object of the invention is to devise a proximity printing device in which the angle of the light with which a workpiece is irradiated can be changed.

A second object of the invention is to devise a proximity printing device in which any adjustment and any positioning of the irradiation angle with respect to the workpiece are possible while maintaining a vertical state of a light source part provided with a discharge lamp, and in which no deviation from the adjusted irradiation angle occurs even when exposed to external forces.

The above described objects are achieved in accordance with the present invention as follows:

(1) In a proximity printing device which contains a light irradiation part for emitting light which contains UV radiation, a mask carrier for holding a mask and a workpiece carrier for holding a workpiece, there is a device which tilts the light irradiation part such that the light from the light irradiation part obliquely irradiates the workpiece.

By this measure, i.e., that there is a device for tilting the light irradiation part so that the workpiece can be obliquely irradiated with light, the stepped area and the like of the workpiece can be obliquely irradiated with light, and workpieces with steps and other workpieces which need to be irradiated obliquely with light can be effectively irradiated with light.

(2) The above objects are furthermore achieved in accordance with the invention by a proximity printing device that is provided with the following features:

A tilt frame for attaching the light irradiation part; a base for pivoted holding of the tilt frame via a rotary motion guide; a light source part which is pivotally connected to the tilt frame via a rotary axis bearing and which delivers the light which contains UV light and which is emitted from a discharge lamp to the light irradiation part; a means for horizontal guidance which controls the drive direction of the light source part relative to the horizontal direction; a drive means for driving the light source part along the horizontal guidance means in the horizontal direction; a retaining means for holding the horizontal guidance means and a support means which movably supports the retaining means at the top and bottom via a linear guidance means, and by driving of the drive means, the light irradiation part being tilted, the light source part being kept vertical, and by oblique irradiation of a workpiece being performed with light from the light irradiation part.

By this arrangement, while maintaining the vertical state of the light source part provided with the discharge lamp, the irradiation angle can be optionally adjusted and positioned with respect to the workpiece. Furthermore, the light source part can also be kept vertical even when it is exposed to external forces. In this way, when the lamp housing is exposed to external forces, any deviation from the adjusted irradiation angle is prevented.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIG. 5 (b) shows a schematic of the state of the arc in an inclined lamp;

DETAILED DESCRIPTION OF THE PREFERRED EMBODIMENTS

Figure 1:
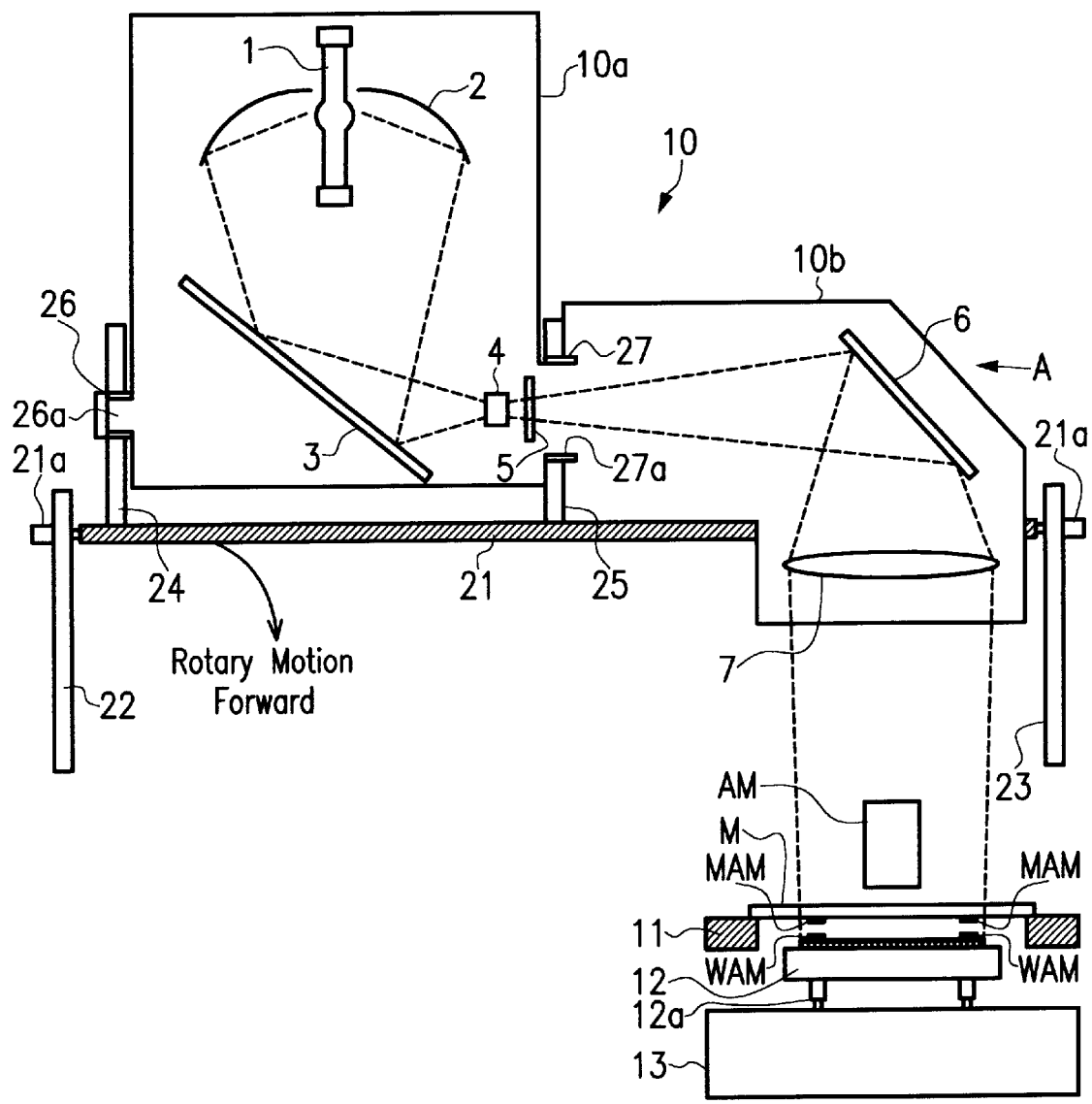
FIG. 1 is a schematic depiction of the overall arrangement of an embodiment of a proximity printing device in accordance with the invention.
Figure 8:
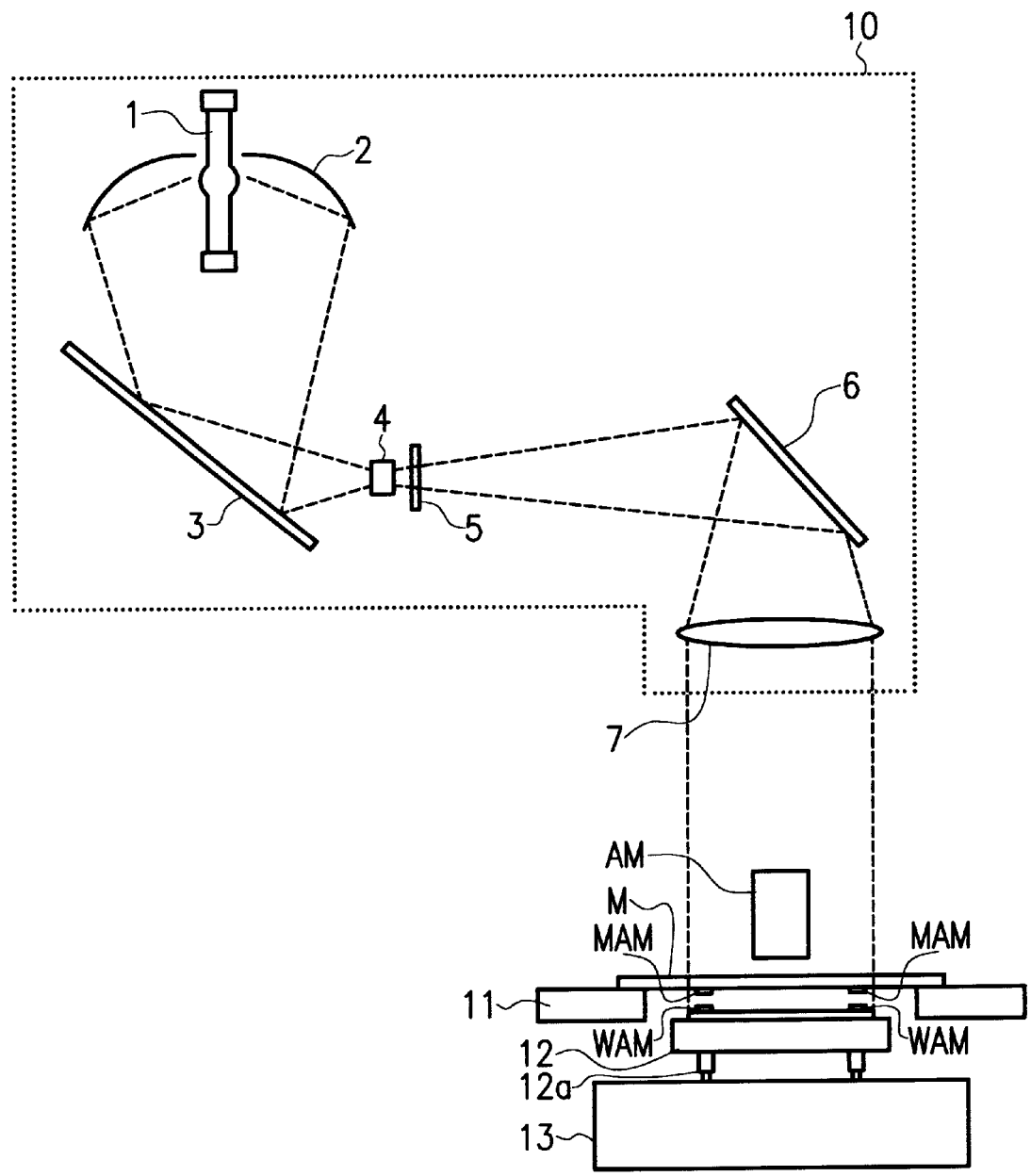
FIG. 8 is a schematic representation of the arrangement of a conventional proximity printing device.
Figure 9A:
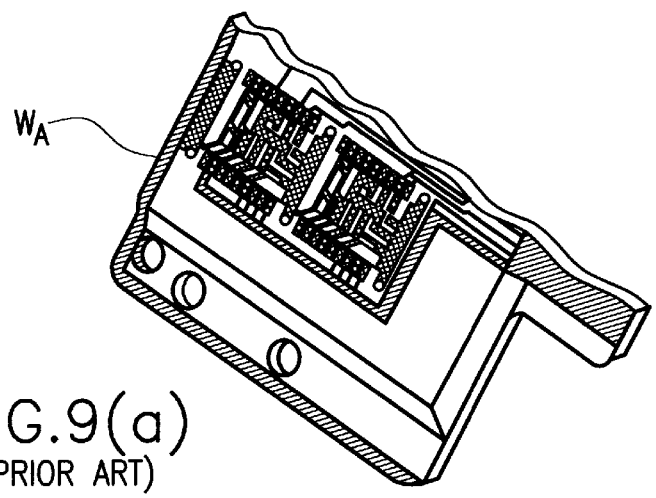
FIG. 9A & 9B show a workpiece with stepped areas, and workpieces having a three-dimensional arrangement, respectively.
Figure 9B:
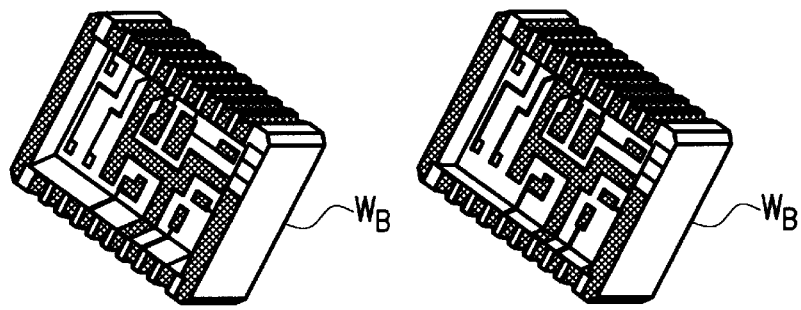

FIG. 1 is a schematic of the overall arrangement of a first embodiment of the proximity printing device in accordance with the present invention. In the drawing, reference number 10a indicates a light source part and 10b an exit part which together form a light irradiation device 10. In light source part 10a and exit part 10b, there are a discharge lamp 1, which emits light which contains UV radiation (such as a super high pressure mercury lamp) or the like, an oval focusing mirror 2, a first mirror 3, an integrator lens 4, a shutter 5, a second mirror 6, and a collimator 7 arranged in the same manner as in FIG. 8.

The UV containing light emitted from discharge lamp 1 is focused by the oval focusing mirror 2, then is reflected by the first mirror 3, and is incident on integrator lens 4. Furthermore, the light emerging from the integrator lens 4 passes through the shutter 5, is reflected by the second mirror 6 and emerges from light irradiation device 10 via the collimator 7.

Furthermore, a mask carrier 11 is provided on which mask M is seated and attached, and workpiece W is seated and attached on a workpiece carrier 12. A gap adjustment device is located between the workpiece carrier 12 and an X-Y-Z-θ carrier 13.

An alignment microscope AM is provided for observing the mask alignment marks MAM of mask M and workpiece alignment marks WAM of workpiece W with which the mask M and workpiece W are aligned. Accordingly, irradiation with UV containing light from the light irradiation device 10 is performed via mask M.

The X-Y-Z-θ carrier 13 is driven by means of a carrier drive device (not shown) and moves the workpiece carrier 12 in the X-Y-Z-θ directions, as was described above. The gap adjustment device 12a is used to set the mask M and workpiece W parallel to one another with a gap therebetween, as was described above.

Exit part 10b is attached on a base 21 which has a projection 21a on each of its left and right sides. Projections 21a are joined together using guides 22a, 23a which are located in arc-shaped arms 22, 23, respectively. Arc-shaped arms 22, 23 are attached in support components (not shown). The base 21 swings forward and downward along the guides 22a, 23a of the arc-shaped arms 22, 23.

Furthermore, bearing supports 24, 25 are installed on base 21 and a respective one first bearing 26 and second bearing 27 is received in each of these bearing supports. First bearing 26 pivotally supports first the cylindrical projection 26a of light source part 10a, and second bearing 27 pivotally supports the second cylindrical projection 27a of the light source part 10a. Therefore, light source part 10a can move around an axis which is formed by an imaginary line extending between the middle of the first cylindrical projection 26a and the middle of the second cylindrical projection 27a. Second bearing 27 and second cylindrical projection 27a have a hollow, i.e., tubular, construction and the light emerging from integrator lens 4 passes through their insides, as is illustrated in FIG. 1.

Figure 2:
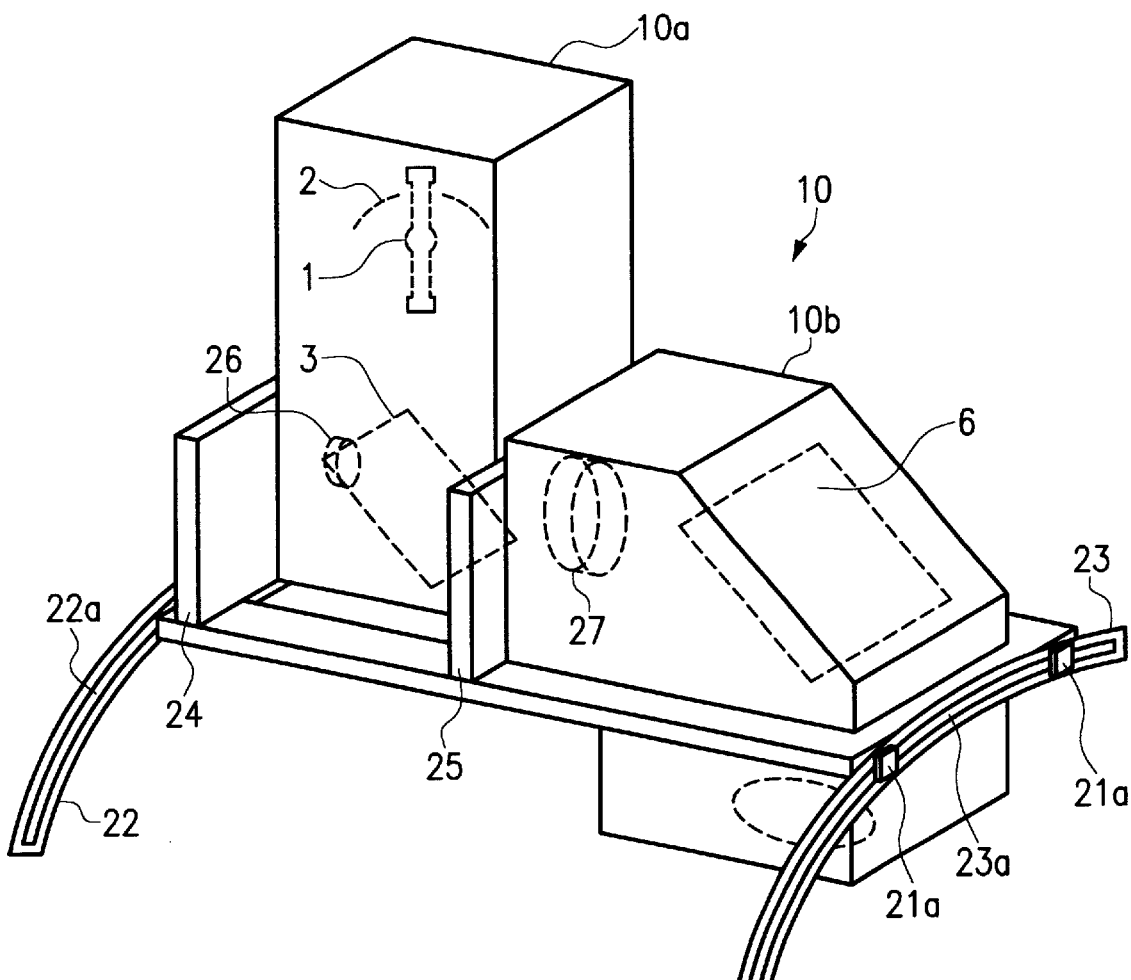
FIG. 2 is a perspective view of the light irradiation part of the invention.
Figure 3:
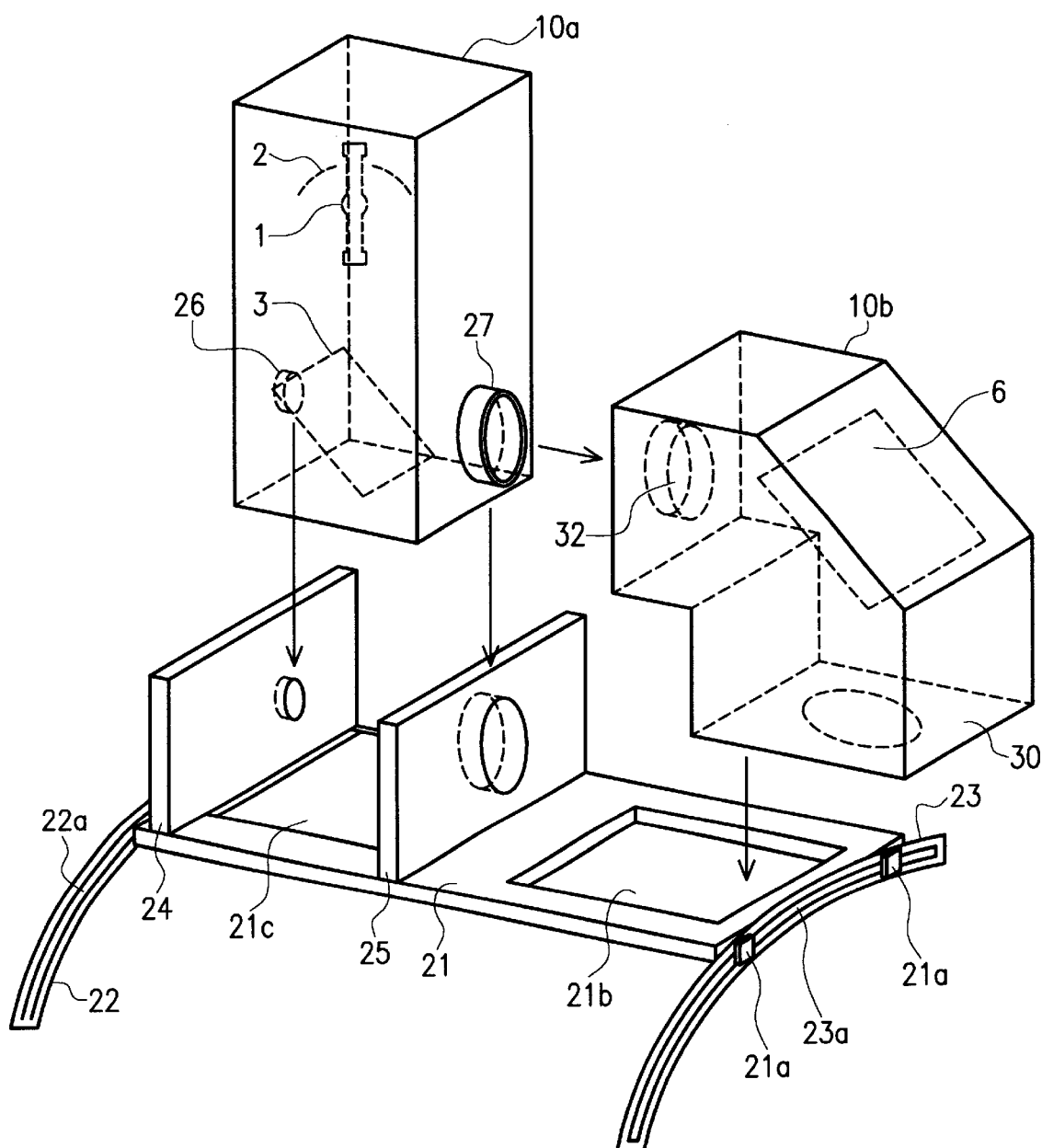
FIG. 3 shows a schematic exploded view of the light irradiation part of the invention.
Figure 4:
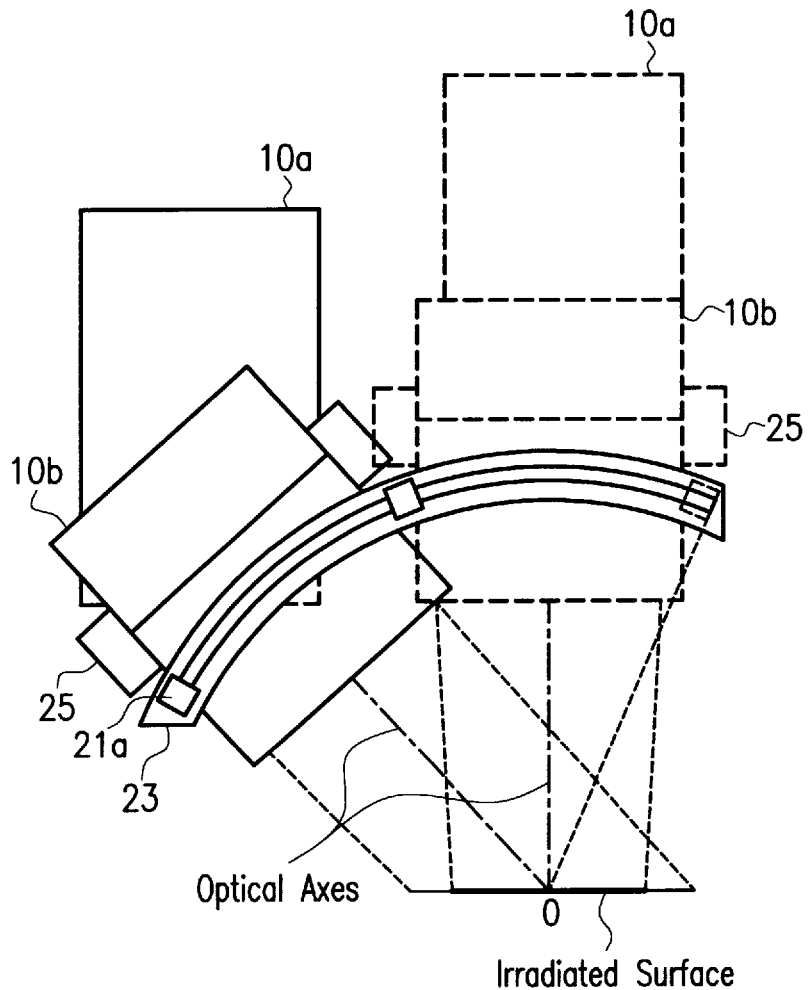
FIG. 4 shows a schematic of the state in which the light irradiation part is inclined in the embodiment of the invention.

FIG. 2 is an exterior view of the light irradiation device 10 and FIG. 3 is a schematic exploded view thereof. FIG. 4 is a view of the light irradiation device in the direction of arrow A in FIG. 1 and which shows a state in which base 21 is shifted from the upright 0° position shown in dashed lines along arc-shaped arms 22, 23 through an angle of roughly 45° into the solid line position shown.

In the following the arrangement of the embodiment of the light irradiation part is further described using FIGS. 2, 3 and 4.

As is shown in FIGS. 2 and 3, in the four corners of base 21 are projections 21a which are joined to arc-shaped guides 22a, 23a which are formed in arc-shaped arms 22, 23, as was described above. Base 21 therefore swings along these arc-shaped guides 22a, 23a.

As is shown in FIG. 3, base 21 is provided with a first opening 21b and a second opening 21c. Exit part 10b is installed in base 21 and has light exit opening 30 which forms a fit with first opening 21b. Furthermore, in base 21, bearing supports 24, 25 are installed which receive first bearing 26 and second bearing 27, respectively. In turn, the bearings 26,27 each receive a respective one of the cylindrical projections 26a, 27a of light source part 10a. Exit part 10b is provided with opening 32 with which second bearing 27 forms a fit.

For mounting of the light irradiation device 10, in this embodiment, projections 21a of base 21 are joined to guides 22a, 23a of the arc-shaped arms 22, 23, by which base 21 is installed in arc-shaped arms 22, 23. Furthermore, light exit opening 30 of exit part 10b is located in opening 21b of base 21, by which exit part 10b is attached in base 21, as is shown in FIGS. 2 & 3.

Then, the second bearing 27, installed in light source part 10a is located in opening 32 of exit part 10b, while first bearing 26 and second bearing 27 are attached in bearing supports 24, 25. In this way, the light irradiation part is mounted in the embodiment as shown in FIG. 2.

In the light irradiation part of this embodiment, light source part 10a is pivotally supported by the first bearing 26 and second bearing 27 with respect to base 21, as was described above. This measure keeps discharge lamp 1 of light source part 10a vertical when base 21 moves along the guides 22a, 23a of the arc-shaped arms 22, 23.

FIG. 4 shows the state in which base 21 is inclined by an angle of roughly 45°. As the drawing shows, exit part 10b is also inclined accordingly when base 21 is inclined. Therefore, the article to be irradiated can be irradiated obliquely with light. In this case, light source part 10a is kept vertical, as is shown in the drawing.

Figure 5A:
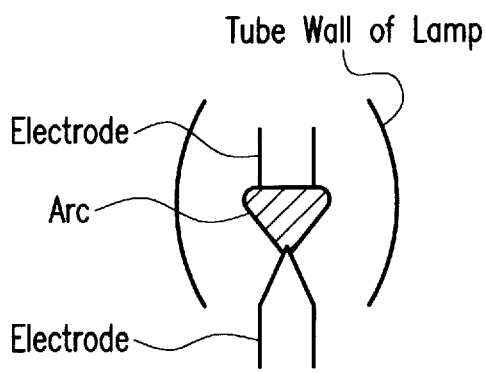
FIG. 5 (a) shows a schematic of the state of the arc in a vertical lamp.
Figure 5B:
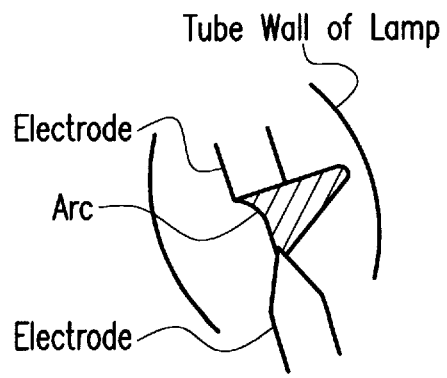

If, during operation, the discharge lamp is kept in the vertical state, the normal shape of the arc between the electrodes is maintained, as shown in FIG. 5(a). However, if the discharge lamp is tilted, the shape of the arc changes, as shown in FIG. 5(b). If the shape of the arc is changed in this way, the temperature of the tube wall of the lamp rises and there is the possibility of the discharge lamp's breaking.

Therefore, it is a good idea to keep the discharge lamp vertical during operation. The above described arrangement can keep the discharge lamp vertical and thus prevent it from breaking.

To always keep light source part 10a in a vertical position, a counterbalance weight piece or the like can be installed, for example, on the underside of the light source part 10a.

Centers 0 of the arcs of the arc-shaped arms 22, 23 essentially agree with the center area of the surface irradiated with light. The optical axis of the light emerging from exit part 10b, therefore, always passes essentially through the center area of the surface irradiated with light, even if base 21 is swinging. Therefore, execution of the above described exposure can be guaranteed.

In the following, exposure is described using the proximity printing device of this embodiment.

Figures 10A, 10B:
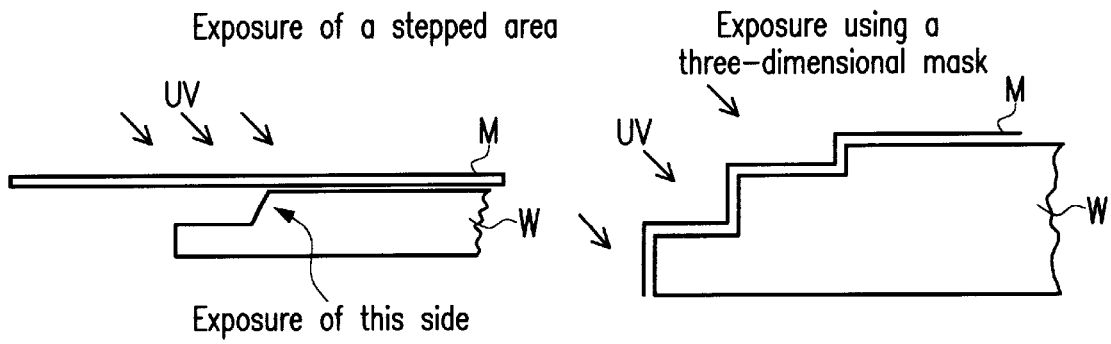
FIGS. 10(a) & 10(b) each show a schematic of the irradiation direction of the light in the case of exposure of a workpiece or the like with stepped areas.

First, according to FIG. 1, mask M is set and attached at a given location on mask carrier 11. Next, workpiece carrier 12 is moved downward by driving the X-Y-Z-θ carrier 13. Thus, for example, workpiece W as shown in FIG. 10(a) with a stepped area is seated on workpiece carrier 12.

Next, mask M and workpiece W are set parallel with a constant gap relative to one another using the above described sequence. In this way, the positions of the mask alignment marks MAM recorded on mask M are brought into agreement with the positions of the workpiece alignment marks WAM recorded on workpiece W.

Next, the base 21 is set horizontally and workpiece W is irradiated with a shot of vertically aligned light via mask M. Then, the base 21 is moved along the guides 22a, 23a of the arc-shaped arms 22, 23, and exit part 10b is tilted, as was indicated above with reference to FIG. 4. Oblique irradiation with a shot of light is performed, so that the stepped area of workpiece W is hit by the light. In this way, the stepped area of the workpiece W can be exposed.

A case of exposure of a workpiece with a stepped area by oblique irradiation with light was described above. However, for example, a liquid crystal substrate can be obliquely irradiated with light, and thus, optical alignment (photoalignment) of an alignment layer or the like can be produced.

In the above described embodiment, a case of exposure was described in which the mask is held horizontal. However, a device for inclining the mask carrier can also be provided, the mask tilted relative to the workpiece, and thus exposure produced if workpieces with the shapes that are shown in FIG. 10(a) and FIG. 10(b) are exposed.

Figure 6:
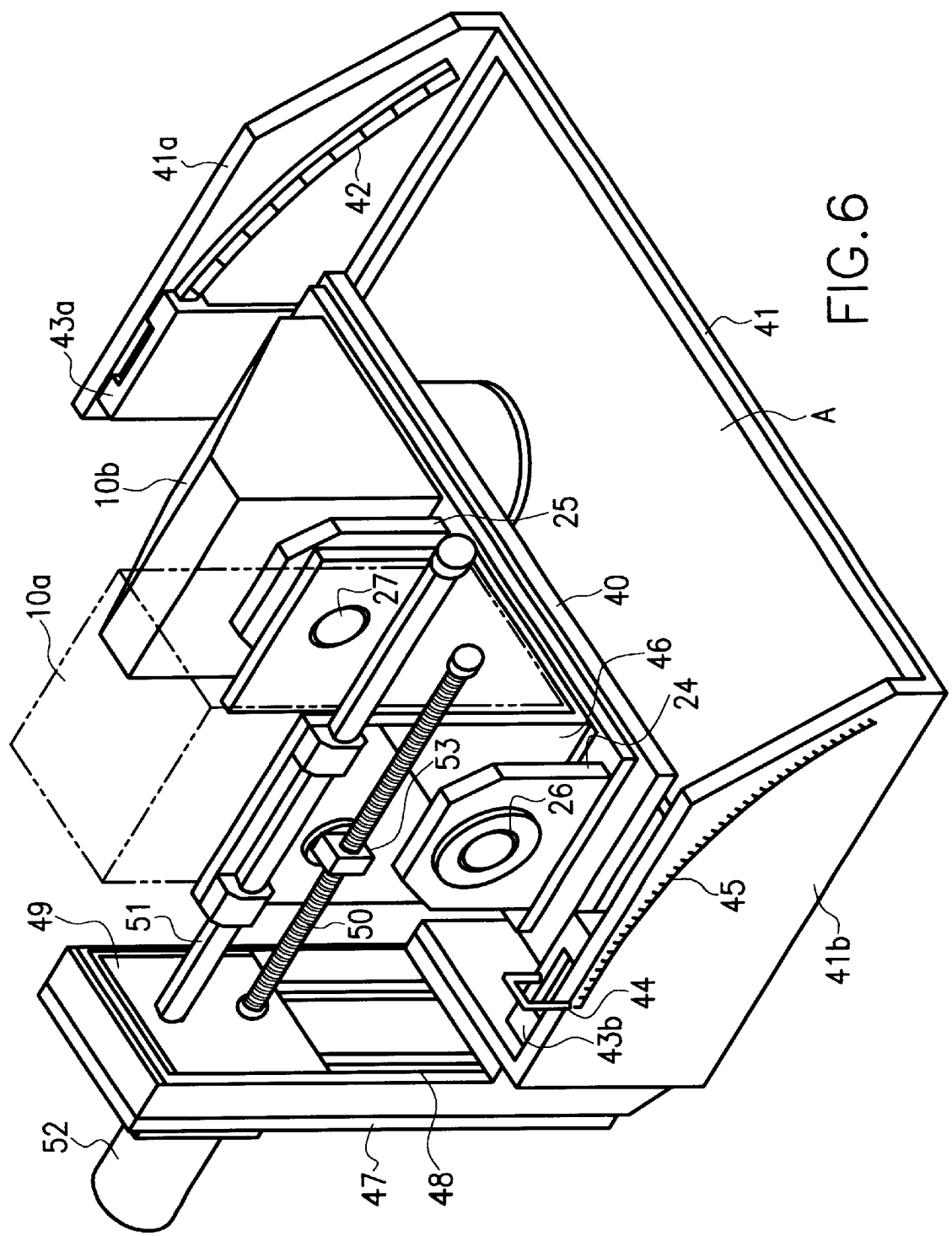
FIG. 6 is a perspective view of a second embodiment of the invention.

FIG. 6 is a schematic illustration of the arrangement of a second embodiment of the proximity printing device in accordance with the invention. In this embodiment, a drive device having a motor and the like is used, and there is a device for inclining the exit part while keeping the light source part vertical.

In FIG. 6, a base 41 has a region A which is open. On either side of the base 41 are guide support parts 41a, 41b on an inner side of which are provided arc-shaped guides 42. Guide bearing supporters 43a, 43b are installed on guides 42, and they can be moved along the guides 42 (in the drawing only one of the guides is shown, but both of the guide support parts 41a, 41b are provided with a guide 42).

A tilt frame 40 is installed in guide bearing supporters 43a, 43b which tilts when the guide bearing supporters 43a, 43b move along the guides 42. Furthermore, the guide bearing supporter 43b is provided with a tilt angle indicator 44 which coacts with an angle index mark 45 that is recorded on the guide support part 41b.

On tilt frame 40, the exit part 10b and bearing supports 24, 25 are installed. Bearing support 24 is provided with first bearing 26 and bearing support 25 is provided with second bearing 27. First bearing 26 and second bearing 27 pivotally hold the light source part receiver plate 46. This means that the light source part receiver plate 46 turns around an axis which is extends between the center of the first bearing 26 and the center of the second bearing 27.

Light source part 10a is shown by dot-dash lines in FIG. 6 and is seated on the light source part receiver plate 46. The tilt frame 40 has an opening under the light source part receiver plate 46. In the light source part 10a and exit part 10b, there are contained the discharge lamp which emits light which contains UV light, and the oval focusing mirror, the first mirror, the integrator lens, the shutter, the second mirror, and the collimator, as was described relative to FIG. 1. Furthermore, underneath exit part 10b are the mask carrier 11 and workpiece carrier 12, as was described above using FIG. 1. The light emitted from exit part 10b is incident on the workpiece W via the mask M seated on mask carrier 11.

Furthermore, base 41 is provided with a movement plate support 47 in which a movement plate 49 is installed via a linear guide 48. Movement plate 49 can therefore be moved up and down along linear guide 48. On the back of movement plate support 47, a weight piece is positioned to move up and down; this is not shown in FIG. 6. Movement plate 49 and this weight piece are interconnected using a wire or the like, the wire being held by a roller which is installed on movement plate support 47 (this weight piece, the roller and the wire are described using FIG. 7).

In movement plate 49, a ball circulating spindle 50 and ball spline 51 are installed. Ball circulating spindle 50 is subjected by motor 52 to rotary drive which moves together with movement plate 49. Motor 52 has a brake and is coupled via a clutch to ball circulating spindle 50.

The ball circulating spindle 50 is joined to the ball circulating spindle bearing 53 to which the light source part receiver plate 46 is connected. Furthermore, the light source part receiver plate 46 is installed on the ball spline 51 such that light source part receiver plate 46 can be moved in the axial direction of ball spline 51. Therefore, when the motor 52 is driven, the light source part receiver plate 46 is moved in the axial direction of ball spline 51 while maintaining a vertical orientation. The tilt frame 40 and exit part 10b move along the guides 42 and are tilted.

Figure 7A:
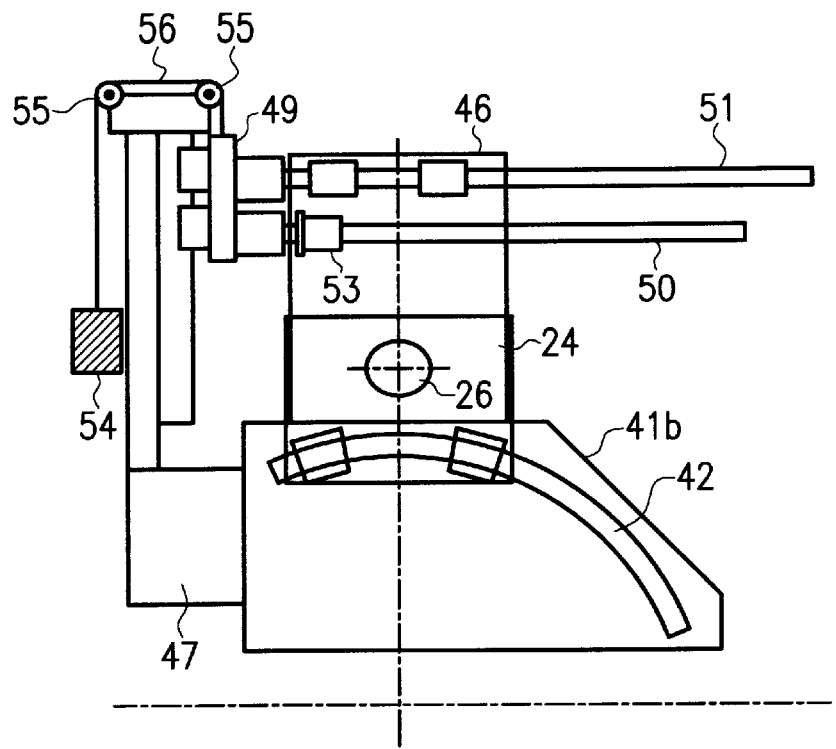
FIGS. 7 (a) and 7 (b) are schematic representation's of the arrangement of the light irradiation part of the second embodiment in 0° upright and 45° inclined orientations, respectively.
Figure 7B:
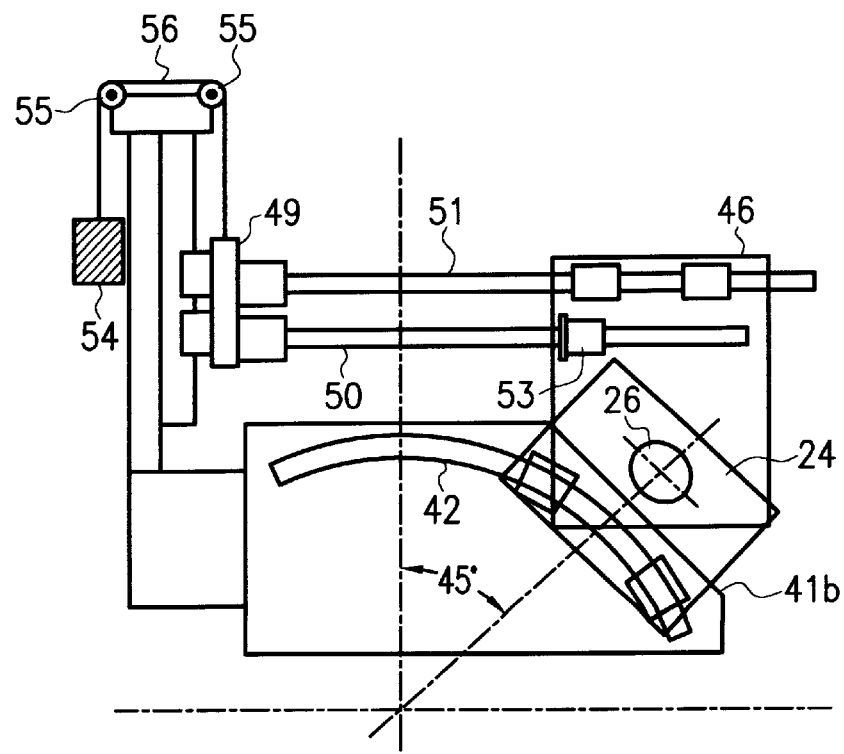

FIGS. 7(a) & 7(b) schematically show arrangements in which the tilt frame 40 and exit part 10b of this embodiment are tilted in different ways. FIG. 7(a) shows an upright state in which there is a angle 0° of inclination and FIG. 7(b) shows a state in which they are tilted at an angle of 45°. In the drawing, the same parts are labeled with the same reference numbers as in FIG. 6, motor 52 not being shown in FIG. 7(a) and FIG. 7(b).

As the drawing shows, the weight piece 54 is suspended on the back of movement plate 49 of movement plate support 47. Above movement plate support 47 is a roller 55 which is provided with a wire 56. On the opposite ends of wire 56 are movement plate 49 and weight piece 54, respectively. The weight of weight piece 54 is essentially equal to the combined weights of the movement plate 49, motor 52, ball circulating spindle 50 and ball spline 51. The weight of movement plate 49 can be raised by weight piece 54, so that the ball circulating spindle 50 and ball spline 51 are, therefore, not loaded by the weight of movement plate 49 and motor 52 when the tilt frame is inclined. This can prevent ball circulating spindle 50 and ball spline 51 from being exposed to bending forces.

If, proceeding from the state as shown in FIG. 7(a), the motor 52 is driven, the ball circulating spindle 50 is turned, ball circulating spindle bearing 53 is moved to the right in the drawing and the light source part receiver plate 46 attached thereto is likewise moved. The position of light source part receiver plate 46 is determined by ball spline 51. Light source part receiver plate 46 therefore moves parallel to the ball spline 51.

Since the tilt frame 40 is coupled via two bearings 26, 27 to the light source part receiver plate 46, the tilt frame 40 is tilted in the horizontal direction along the guides 42 according to the movement of the light source part receiver plate 46. If tilt frame 40 is tilted in this way, light source part receiver plate 46 is exposed to a force and is thus moved down, and movement plate 49 to which the ball circulating spindle 50 and the ball spline 51 are connected moves down.

By turning the ball circulating spindle 50 by the drive of motor 52, in this way, the exit part 10b attached in tilt frame 40 executes a rotational motion around the center axis of the two bearings 26, 27, as is shown in FIG. 7(b). Light source part 10a moves down since it is attached to the light source part receiver plate 46, but its vertical orientation is maintained.

When the tilt frame 40 is tilted, the tilt angle indicator 44 is moved at the same time and the tilt angle is indicated by the angle index mark 45 which is recorded on guide support part 41b. Angle index mark 45 confirms the tilt angle and motor 52 is then stopped if exit part 10b has tilted to the required tilt angle. In this way, motor 52 is stopped and exit part 10b is attached at the given angle.

In this embodiment, the light source part 10a can also be kept vertical when light source part 10a is exposed to external forces, because light source part 10a is seated on the light source part receiver plate 46 which is held stationary by ball spline 51, as was described above. This prevents light source part 10a from tilting.

Furthermore, the irradiation angle can be optionally positioned and set by ball circulating spindle 50 being driven and stopped by motor 52. In this way, when the lamp housing is exposed to external forces any deviation from the set irradiation angle is prevented.

Additionally, by moving the tilt frame 40 along the guides 42, the center of irradiation from the light source part 10a is not changed either with vertical irradiation or with oblique irradiation. Thus, the workpiece can be exposed in a given location of the workpiece carrier with high precision.

Exposure using the proximity printing device in this embodiment is identical to exposure in the above described first embodiment. In the case of exposure by oblique irradiation with light, motor 52 is driven, the exit part 10b is tilted with respect to the workpiece by a desired angle, and thus, the stepped areas of the workpiece with steps, a liquid crystal substrate, and the like are exposed.

Action of the invention

As was described above, in accordance with the invention, the following actions can be obtained:

(1) By the measure that there is a device for tilting the light irradiation part so that the workpiece can be obliquely irradiated with light, the stepped area and the like of the workpiece can be effectively irradiated with light.

Furthermore, the device can also be used for optical alignment (photoalignment) of an alignment layer of a liquid crystal substrate and for similar purposes.

(2) By the arrangement of a drive means for driving the light source part in the horizontal direction along the horizontal guidance means, the irradiation angle with respect to the workpiece can be optionally set and positioned by driving or stopping this drive means.

Furthermore, when the lamp housing is exposed to external forces any deviation from the set irradiation angle is prevented.

(3) The light source part can be kept vertical even when it is exposed to external forces by the measure that the light source part is seated on a light source part receiver plate with motion fixed by a guide for horizontal motion relative to a horizontal direction.

(4) By moving the tilt frame along the rotary motion guides the irradiation center from the light source part is not changed either with vertical irradiation or with oblique irradiation. Thus, the workpiece can be exposed at a given location of the workpiece carrier with high precision.

What we claim is:

1. Proximity printing device comprising a light irradiation part from which light that contains UV radiation is emitted, a mask carrier for holding a mask and a workpiece carrier for holding a workpiece, and a means for tilting the light irradiation part between a position in which light is emitted from the light irradiation part along a vertical optical axis for vertically irradiating a workpiece on the workpiece carrier with light from the light irradiation part and a position in which light is emitted from the light irradiation part along an oblique optical axis for obliquely irradiating the workpiece.

2. Proximity printing device comprising a light irradiation part for emitting light which contains UV radiation, a mask carrier for holding a mask and a workpiece carrier for holding a workpiece, and a means for tilting the light irradiation part between a position for vertically irradiating a workpiece on the workpiece carrier with light from the light irradiation part and a position for obliquely irradiating the workpiece; wherein said means for tilting comprises:

a tilt frame for attaching the light irradiation part;

a base for pivotable holding of the tilt frame via a rotary motion guide, a light source part which is pivotally connected to the tilt frame via a rotary axis bearing and which delivers the light which contains UV radiation and which is emitted from a discharge lamp to a light irradiation part;

a horizontal guidance means for controlling the drive direction of the light source part relative to a horizontal direction;

a drive means for driving the light source part along the horizontal guidance means in the horizontal direction;

a retaining means for holding the horizontal guidance means; and a support means for movably supporting the retaining means in up and down directions via a linear guidance means;

wherein, by the driving of the drive means, the light exit part is tilted and the light source part is kept vertical; and wherein oblique irradiation of a workpiece is produced with light emitted from the light irradiation part.

3. Proximity printing device comprising a light irradiation part for emitting light which contains UV radiation, a mask carrier for holding a mask and a workpiece carrier for holding a workpiece, and a means for tilting the light irradiation part between a position for vertically irradiating a workpiece on the workpiece carrier with light from the light irradiation part and a position for obliquely irradiating the workpiece; wherein said means for tilting comprises a base supported for arcuate movement by guides; wherein said light irradiation part comprises a light source part and a light exit part; wherein said light source part is carried by the base in a manner enabling a relative pivoting motion therebetween; wherein the light exit part is connected to the base for arcuate movement therewith and is connected to said light source part in a manner enabling relative rotation therebetween while permitting passage of light from said light source part to said light exit part, whereby said workpiece can be obliquely and vertically illuminated with light from said light exit part while said light source part is maintained in a vertical orientation.

4. Proximity printing device according to claim 1, wherein said mask carrier and said workpiece carrier are positioned for holding the mask in proximity to the workpiece with a small empty space therebetween.

* * * * *